(12) United States Patent  (10) Patent No.: US 9,421,622 B2
Segev et al.  (45) Date of Patent: Aug. 23, 2016

(54) INDEXABLE CENTRAL DRILL INSERT AND CUTTING TOOL THEREFOR

(71) Applicant: Iscar, Ltd., Tefen (IL)

(72) Inventors: Eden Segev, Gilon (IL); Mark Kitapov, Nahariya (IL)

(73) Assignee: Iscar, Ltd., Tefen (IL)

( * ) Notice: Subject to any disclaimer, the term of this patent is extended or adjusted under 35 U.S.C. 154(b) by 313 days.

(21) Appl. No.: 14/155,122

(22) Filed: Jan. 14, 2014

(65) Prior Publication Data

US 2015/0196961 A1 Jul. 16, 2015

(51) Int. Cl.
 *B23B 51/00* (2006.01)
 *B23B 51/04* (2006.01)

(52) U.S. Cl.
 CPC .......... *B23B 51/048* (2013.01); *B23B 51/0063* (2013.01); *B23B 2200/3627* (2013.01); *B23B 2251/18* (2013.01); *B23B 2251/50* (2013.01); *B23B 2251/603* (2013.01); *Y10T 407/2274* (2015.01); *Y10T 408/8923* (2015.01); *Y10T 408/906* (2015.01); *Y10T 408/90993* (2015.01)

(58) Field of Classification Search
 CPC ............. B23B 51/048; B23B 51/0063; B23B 27/1622; B23B 27/145; B23B 2200/121; B23B 2200/3627; B23B 2200/049; B23B 2251/18; B23B 2251/50; B23B 2251/505; B23B 2251/603; B23B 2251/606; Y10T 407/23; Y10T 407/2274; Y10T 408/8923; Y10T 408/906; Y10T 408/90993
 See application file for complete search history.

(56) References Cited

U.S. PATENT DOCUMENTS

| 4,100,983 | A |  | 7/1978 | Herrmann et al. |
|---|---|---|---|---|
| 5,259,707 | A |  | 11/1993 | Keller |
| 5,308,197 | A | * | 5/1994 | Little ............... B23B 27/065 407/101 |
| 5,505,569 | A |  | 4/1996 | Gustafsson et al. |
| 5,688,083 | A | * | 11/1997 | Boianjiu ............ B23B 27/141 407/113 |

(Continued)

FOREIGN PATENT DOCUMENTS

| DE | 19710996 A1 | 9/1998 |
|---|---|---|
| EP | 1080812 A2 | 3/2001 |

(Continued)

OTHER PUBLICATIONS

International Search Report dated Jun. 3, 2015 issued in PCT counterpart application (No. PCT/IL2014/051095).

*Primary Examiner* — Eric A Gates
(74) *Attorney, Agent, or Firm* — Womble Carlyle

(57) ABSTRACT

A central drill insert has a bottom surface, a top surface, and a peripheral surface extending therebetween. At least three lead drill portions protrude outwards from the peripheral surface, each having a drill axis and a plurality of drill cutting edges. A secondary cutting edge is adjacent each lead drill portion, extending along the intersection of the top surface and the peripheral surface, transversely to the respective drill axis. Each secondary cutting edge is spaced apart from the associated drill cutting edges along the drill axis. A dovetail abutment flank is formed on the peripheral surface along the intersection of the top surface and the peripheral surface, extending from each one of the lead drill portions towards the secondary cutting edge associated with another lead drill portion. A cutting tool has an insert pocket for retaining the central drill insert with the operative drill axis aligned with the tool axis.

18 Claims, 3 Drawing Sheets

(56) References Cited

U.S. PATENT DOCUMENTS

| | | | |
|---|---|---|---|
| 5,810,518 A * | 9/1998 | Wiman | B23B 27/065 407/102 |
| 5,954,459 A | 9/1999 | Noguchi et al. | |
| 6,527,485 B1 * | 3/2003 | Little | B23B 27/065 407/24 |
| 7,108,460 B2 * | 9/2006 | Chang | B23B 27/145 408/223 |
| 8,192,114 B2 * | 6/2012 | Chang | B23B 27/1622 407/103 |
| 8,967,921 B2 * | 3/2015 | Yamaguchi | B23B 51/048 407/113 |
| 9,103,418 B2 * | 8/2015 | Hecht | B23B 27/1622 |
| 9,216,463 B2 * | 12/2015 | Hecht | B23B 27/007 |
| 2004/0124016 A1 | 7/2004 | Nuzzi et al. | |
| 2011/0305534 A1 * | 12/2011 | Park | B23B 27/141 407/100 |
| 2012/0189393 A1 | 7/2012 | Reiner et al. | |
| 2012/0201622 A1 * | 8/2012 | Kocherovsky | B23B 29/02 409/131 |
| 2014/0050542 A1 * | 2/2014 | Zeeb | B23B 27/04 407/103 |

FOREIGN PATENT DOCUMENTS

| | | | |
|---|---|---|---|
| EP | 2213399 A1 * | 8/2010 | B23B 27/065 |
| EP | 2532461 | 12/2012 | |

* cited by examiner

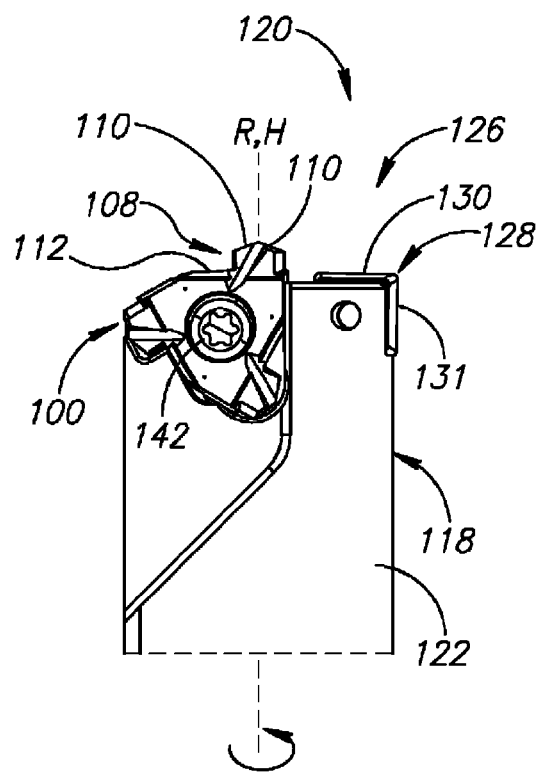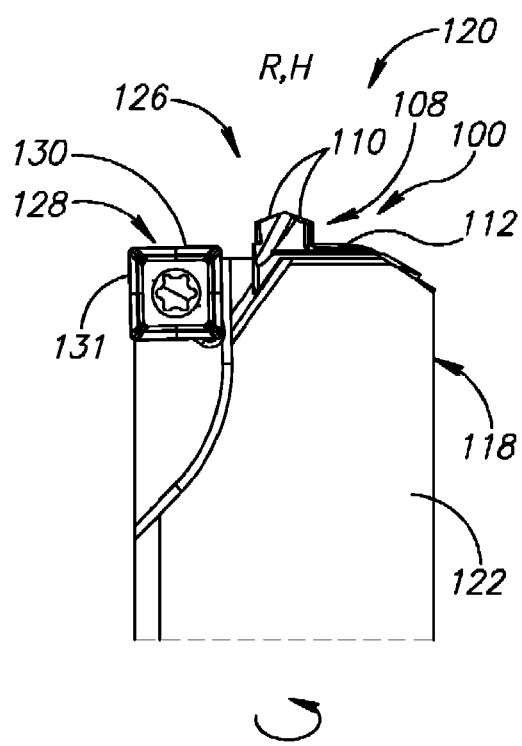
FIG.4    FIG.5
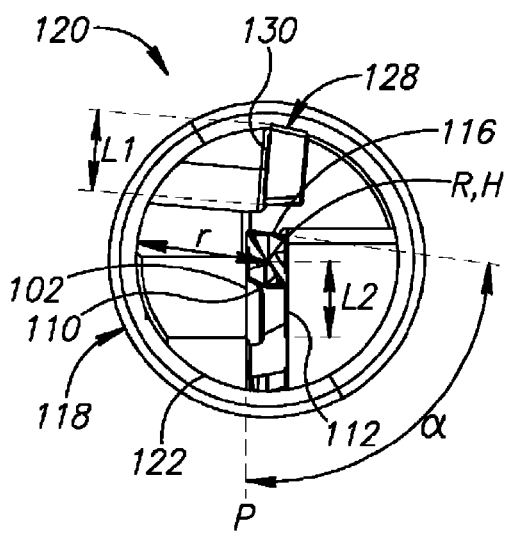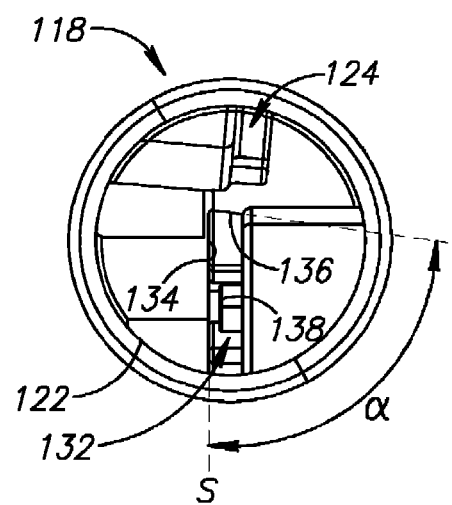
FIG.6    FIG.7

INDEXABLE CENTRAL DRILL INSERT AND CUTTING TOOL THEREFOR

FIELD OF THE INVENTION

The present invention relates to indexable cutting inserts and cutting tools therefor, in general, and to an indexable central drill insert and a cutting tool therefor, in particular.

BACKGROUND OF THE INVENTION

Metal cutting tools such as spot drills or pilot drills have a spot drill insert retained at the front of the drill, and possibly additional cutting inserts positioned alongside the spot drill insert. The spot drill insert may have multiple cutting areas, and it may be indexable for using a different cutting area when a used cutting area is worn or damaged.

The drill body has respective insert pockets adapted for receiving the spot drill insert and the additional cutting inserts, and retaining these inserts during machining operations. Cutting inserts and cutting tools as described above are shown, for example, in the following patent publications: DE19710996, EP1080812, U.S. Pat. No. 4,100,983, U.S. Pat. No. 5,259,707, U.S. Pat. No. 5,688,083, U.S. Pat. No. 5,505,569, U.S. Pat. No. 5,954,459, U.S. Pat. No. 7,108,460, US2004/124016, US2011/305534 and US2012/189393.

It is an object of the present invention to provide a novel indexable central drill insert with a plurality of lead drill portions and respective secondary cutting edges, and a tool holder with a central drill insert pocket suitable for receiving and firmly retaining the central drill insert.

SUMMARY OF THE INVENTION

In accordance with the subject matter of the present application, there is provided a central drill insert having rotational symmetry about a central insert axis, the central drill insert comprising:
  a bottom surface having a bottom plane, a top surface, and a peripheral surface extending therebetween;
  at least three lead drill portions protruding outwards from the peripheral surface, each lead drill portion having a drill axis and a plurality of drill cutting edges converging towards the drill axis;
  at least three secondary cutting edges, each adjacent an associated lead drill portion, extending along the intersection of the top surface and the peripheral surface transversely to the respective drill axis, each secondary cutting edge being axially spaced apart from the drill cutting edges of the respective lead drill portion along the respective drill axis;
  at least three abutment undercuts, each formed on the peripheral surface along the intersection of the bottom surface and the peripheral surface and extending opposite one of the secondary cutting edges; and
  at least three abutment flanks formed on the peripheral surface along the intersection of the top surface and the peripheral surface, each extending from one of the lead drill portions towards the secondary cutting edge associated with another lead drill portion, each abutment flank forming a dovetail angle with the bottom plane.

In accordance with the subject matter of another embodiment of the present application, there is provided a cutting tool having a tool holder with a shank and a central rotation axis, the cutting tool comprising:
  a first insert pocket formed at a front end of the tool holder, and a side cutting insert retained therein, the side cutting insert having a first cutting edge transverse to the rotation axis;
  a second insert pocket formed at the front end of the tool holder rotationally opposite of the first insert pocket, and a central drill insert retained therein, the central drill insert having rotational symmetry about a central insert axis, the central drill insert comprising:
    a bottom surface, a top surface, a peripheral surface extending therebetween, and at least three lead drill portions protruding outwards from the peripheral surface, each lead drill portion having a drill axis and a plurality drill cutting edges converging towards the drill axis, one of the drill axes coincides with the rotation axis of the tool holder;
    at least three secondary cutting edges, each adjacent an associated lead drill portion, extending along the intersection of the top surface and the peripheral surface transversely to the respective drill axis, each secondary cutting edge being axially spaced apart from the drill cutting edges of the respective lead drill portion along the respective drill axis;
    at least three abutment undercuts formed on the peripheral surface along the intersection of the bottom surface and the peripheral surface, each extending opposite one of the secondary cutting edges; and
    at least three abutment flanks formed on the peripheral surface along the intersection of the top surface and the peripheral surface, each extending from one of the lead drill portions towards the secondary cutting edge associated with another lead drill portion.

In accordance with the subject matter of a further embodiment of the present application, there is provided the cutting tool as described above, wherein:
  the second insert pocket has a support surface with a support plane, extending parallel to the rotation axis, for abutting the bottom surface of the central drill insert;
  a dovetail clamping surface forming a dovetail angle with the support plane, for abutting one of the abutment flanks of the central drill insert;
  a clamping ledge located across from the dovetail clamping surface, for abutting one of the abutment undercuts of the central drill insert.

In accordance with the subject matter of another embodiment of the present application, there is provided a cutting tool having a cutting tool front end and a central rotation axis, the cutting tool front end comprising:
  a first insert pocket;
  a side cutting insert retained in the first insert pocket, the side cutting insert having a first cutting edge transverse to the rotation axis;
  a second insert pocket formed at the front end and rotationally opposite the first insert pocket about the central rotation axis; and
  a central drill insert retained in the second insert pocket, the central drill insert having rotational symmetry about a central insert axis, the central drill insert comprising:
    a bottom surface, a top surface, a peripheral surface extending therebetween, and at least two lead drill portions protruding outwards from the peripheral surface, each lead drill portion having a drill axis and a plurality drill cutting edges converging towards the drill axis, one of the drill axes coincides with the rotation axis of the tool holder;
    at least two secondary cutting edges, each adjacent an associated lead drill portion, extending along the intersection of the top surface and the peripheral surface transversely to the respective drill axis, each secondary cutting edge being axially spaced apart from the drill cutting edges of the respective lead drill portion along the respective drill axis; wherein:

the side cutting insert and the central drill insert are the only cutting inserts at the tool front end.

In accordance with the subject matter of another embodiment of the present application, there is provided a cutting tool having a tool holder with a shank and a central rotation axis, the cutting tool comprising:

a first insert pocket formed at a front end of the tool holder, and a side cutting insert retained therein, the side cutting insert having a first cutting edge transverse to the rotation axis; and a second insert pocket also formed at the front end of the tool holder, and a central drill insert as described herein above retained therein; wherein:

the side cutting insert and the central drill insert are the only cutting inserts at the tool front end.

BRIEF DESCRIPTION OF THE DRAWINGS

For a better understanding of the present invention and to show how the same may be carried out in practice, reference will now be made to the accompanying drawings, in which:

FIG. 4 is a first side view of the cutting tool of FIG. 1;

FIG. 5 is another side view of the cutting tool of FIG. 1;

FIG. 6 is a front view of the cutting tool of FIG. 1;

FIG. 7 is a front view of the tool holder of the cutting tool of FIG. 1;

Figure 1:
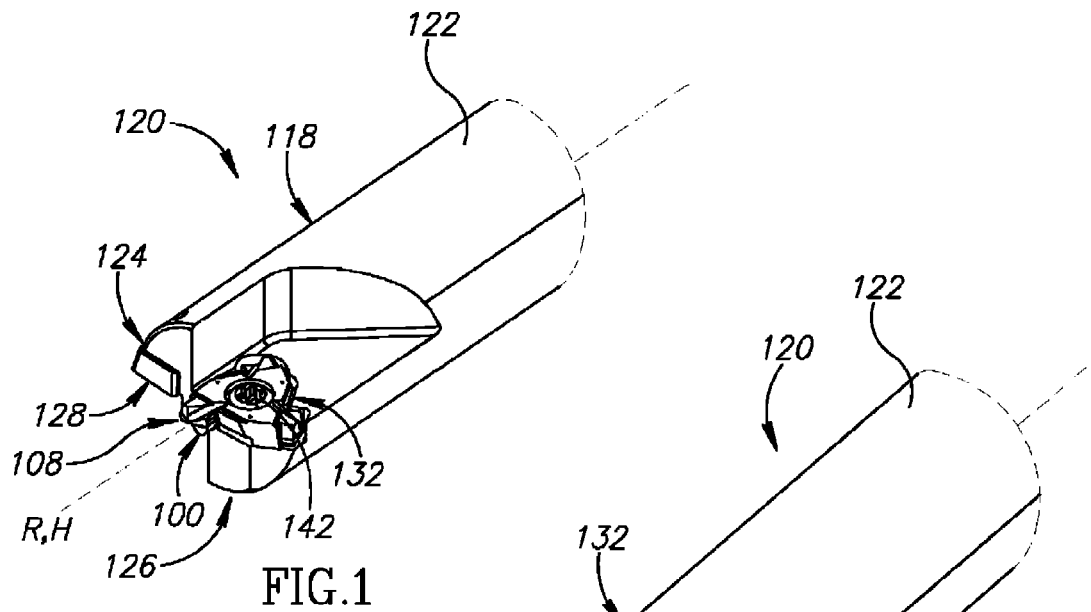
FIG. 1 is a perspective view of a cutting tool according to an embodiment of the present invention.
Figure 2:
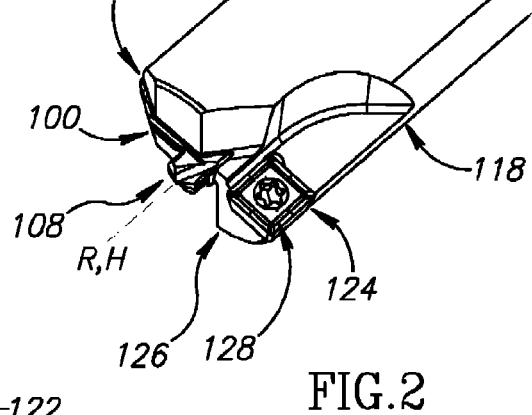
FIG. 2 is another perspective view of the cutting tool of FIG. 1.
Figure 3:
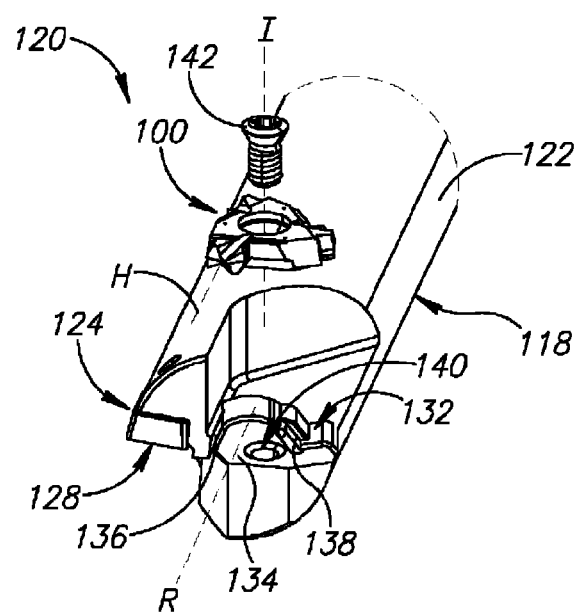
FIG. 3 is a perspective view of the cutting tool of FIG. 1, partially disassembled.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is made to FIGS. 1-7, depicting a cutting tool 120 according to an embodiment of the present invention. The cutting tool 120 is a drilling tool, having a tool holder 118 with a cylindrical shank 122 and a longitudinal rotation axis R. A first insert pocket 124 and a second insert pocket 132 are formed at a front end 126 of the tool holder 118. The first and second insert pockets 124, 132 are rotationally opposite one another about the rotation axis R (i.e., facing in different directions when rotating about the rotation axis R).

A side cutting insert 128 is retained in the first insert pocket 124. The side cutting insert 128 has a first cutting edge 130 extending transverse to the rotation axis R. The side cutting insert 128 may also have a second cutting edge 131, angled relative to the first cutting edge 130. In particular embodiments, the second cutting edge 131 is perpendicular to the first cutting edge 130. As seen in the figures, the second cutting edge 131 extends along the rotation axis R.

It is noted that the second cutting edge 131 is employed when the side cutting insert 128 is indexed, e.g., when the first cutting edge 130 is worn or damaged (i.e., the second cutting edge 131 is not operative when the first cutting edge 130 is in an operative position at the front of the cutting tool 120). In addition to the second cutting edge 131, the side cutting insert 128 may have additional indexing cutting edges (e.g., a total of four cutting edges, as in the square side cutting insert 128 shown in the drawings of the present application).

A central drill insert 100, in accordance with an embodiment of the present invention, is retained in the second insert pocket 132. Reference is further made to FIGS. 8-11, depicting various views of the central drill insert 100. The central drill insert 100 has a central insert axis I, about which the central insert 100 has 120° rotational symmetry (i.e., three-fold rotational symmetry). The central insert 100 comprises a bottom surface 102, a top surface 104, and a peripheral surface 106 extending therebetween. The bottom surface 102 defines a bottom plane P, as seen in FIG. 6. An insert clamping hole 117 passes along the central insert axis I, and opens out to the bottom and top surfaces 102, 104. It is noted that in the present application, the terms "central insert", "central cutting insert" and "central drill insert", are used interchangeably. It would be appreciated that the side cutting insert 128 and the central drill insert 100 are the only cutting inserts at the tool front end 126.

Figure 8:
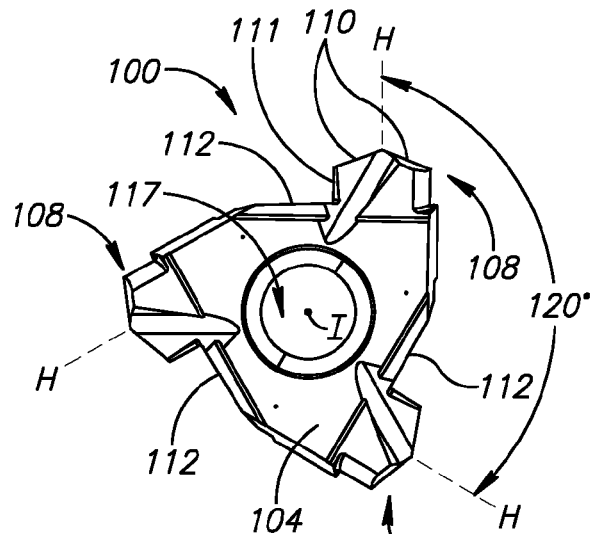
FIG. 8 is a top plan view of the cutting insert of according to an embodiment of the present invention.
Figure 9:
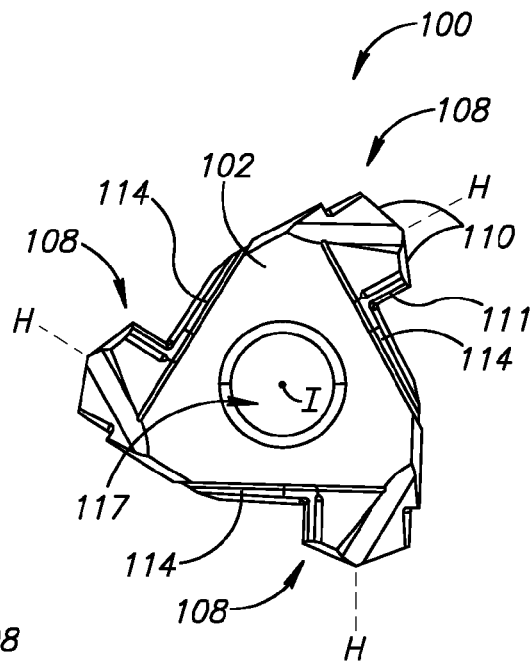
FIG. 9 is a bottom plan view of the cutting insert of FIG. 8.

The central insert 100 has at least three lead drill portions 108 protruding outwards from the peripheral surface 106. Each lead drill portion 108 has a drill axis H and a plurality of front drill cutting edges 110 converging towards the drill axis H. As seen in FIG. 8, each lead drill portion 108 is configured such that its respective drill axis H does not intersect the center axis I in a top view of the central insert. Each drill cutting edge 110 is spaced away from the peripheral surface 106 by at least one drill flank 111. The lead drill portions 108 are arranged symmetrically about the central axis I, such that the angle between one drill axis H to another is 120°, as noted in FIG. 8. The central insert 100 is indexable about the central axis I, such that a different lead drill portion 108 may be employed, if one of the lead drill portions 108 is worn or damaged.

The central insert 100 depicted in the attached drawings has three lead drill portions 108. However, it is noted that the central insert 100 may have more than three lead drill portions 108, in which case the central insert 100 would have an n-fold rotational symmetry about the central axis I (where n is the number of lead drill portions 108). In some embodiments of the cutting tool 150, the central insert 100 may have at least two lead drill portions 108.

A secondary cutting edge 112 is located adjacent each lead drill portion 108, and extends along the intersection of the top surface 104 and the peripheral surface 106, transversely to the respective drill axis H. In some embodiments, each secondary cutting edge 112 may be substantially perpendicular to the respective drill axis H. Each secondary cutting edge 112 is axially spaced apart from the drill cutting edges 110 of the respective lead drill portion 108 along the respective drill axis H. In other words, the secondary cutting edge 112 is located rearwards of the drill cutting edges 110, spaced therefrom by the at least one drill flank 111. Thus, it would be appreciated that the drill cutting edges 110 and the secondary cutting edge 112 are axially non-continuous cutting edges.

Figure 10:
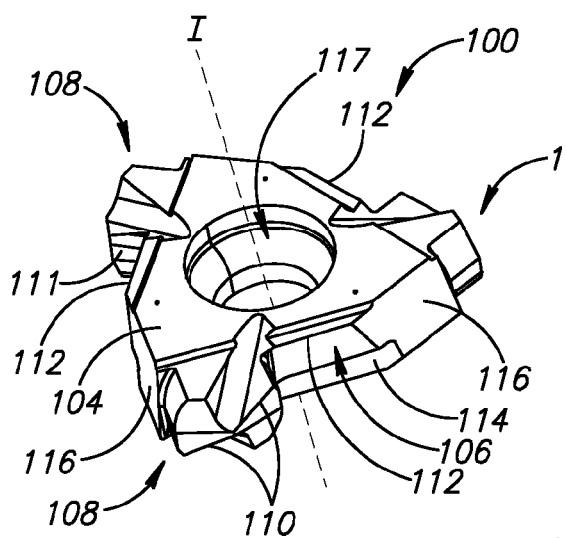
FIG. 10 is a top perspective view of the cutting insert of FIG. 8.
Figure 11:
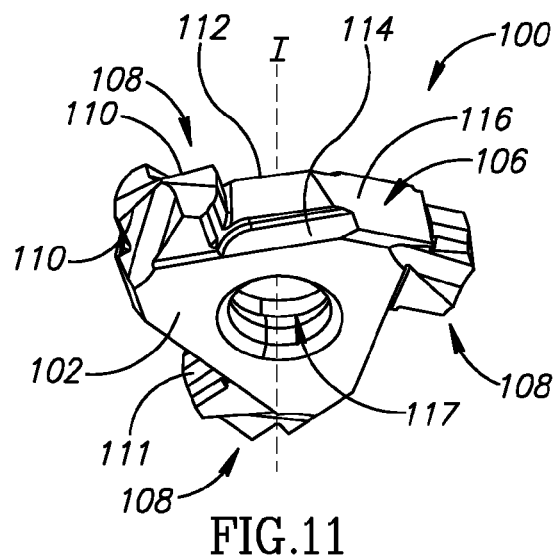
FIG. 11 is a bottom perspective view of the cutting insert of FIG. 8.

An abutment undercut 114 is recessed in the peripheral surface 106 and extends along the intersection of the bottom surface 102 and the peripheral surface 106 opposite each one of the secondary cutting edges 112. An abutment flank 116 is formed on the peripheral surface 106 along the intersection of the top surface 104 and the peripheral surface 106, and extends from each one of the lead drill portions 108 towards the secondary cutting edge 112 associated with another adjacent lead drill portion 108. As best seen in FIG. 10, each abutment flank 116 can be adjacent to the secondary cutting edge 112 associated with that other adjacent lead drill portion 108. Each abutment flank 116 forms a dovetail angle α of less than 90° with the bottom plane P, as noted in FIG. 6.

In the cutting tool 120, the second insert pocket 132 has a support surface 134 defining a support plane S (as noted in FIG. 7), extending parallel to the rotation axis R. A pocket clamping hole 140 passes through the tool holder 118, having an internal threaded surface, and opening out to the support surface 134. A dovetail clamping surface 136 extends away from the support surface 134, forming a dovetail angle α with the support plane S, as noted in FIG. 7. A clamping ledge 138 is formed extending away from the support surface 134, and located across from the dovetail clamping surface 136.

The central insert 100 is retained in the second insert pocket 132 with a clamping screw 142 that passes through the insert clamping hole 117 and threadingly engages the pocket clamping hole 140. The bottom surface 102 of the central insert 100 abuts the support surface 134. One of the abutment undercuts 114 of the central insert 100 abuts the clamping ledge 138. One of the abutment flanks 116 of the central insert 100 abuts the dovetail clamping surface 136. The dovetail angle formed between the dovetail clamping surface 136 and the support plane S may be slightly smaller than the dovetail α, in order to ensure clamping between the dovetail clamping surface 136 and one of the abutment flanks 116.

The dovetail clamping between the abutment flank 116 and the dovetail clamping surface 136 applies a force component perpendicular to the support plane S, for preventing the central insert 100 from being pulled out of the second insert pocket 132 in the direction perpendicular to the support plane S. In addition, each abutment undercut 114 is spaced apart from the opposite secondary cutting edge 112. Thus, upon clamping of the central cutting insert 100, no direct forces are applied on that secondary cutting edge 112, thereby avoiding damage due to clamping forces to that secondary cutting edge 112.

The central insert 100 is retained in the second insert pocket 132, such that one of the lead drill portions 108 of the central insert 100 is operative, and protrudes outwards and forwards of the front end 126 of the tool holder 118. The secondary cutting edge 112 associated with the operative lead drill portion 108 is referred to as the operative secondary cutting edge 112. The drill axis H of the operative lead drill portion 108 coincides with the rotation axis R of the tool holder 118. In this manner, the drill cutting edges 110 of the operative lead drill portion 108 are the forwardmost edges of the cutting tool 120, and are the first to contact the work piece being machined by the cutting tool 120. As the cutting tool 120 is advanced along the rotation axis R further into the work piece, the secondary cutting edge 112 and the first cutting edge 130 of the side cutting insert 128, contact the work piece. Because the operative lead drill portion 108 first contacts the work piece, the cutting tool 120 is stabilized and led steadily along the rotation axis R, with reduced vibrations and deviation from the rotation axis R.

Particular reference is made to FIG. 6, depicting a front view of the cutting tool 120. This view shows that the first cutting edge 130 of the side cutting insert 128 has a first edge length L1. The operative secondary cutting edge 112 and the adjacent operative drill cutting edge 110 have a combined second edge length L2 (i.e., the extent of the operative secondary cutting edge 112 from the rotation axis R). The sum length of the first edge length L1 and the second edge length L2 is larger than the radius r of the cylindrical shank 122, providing radial edge continuity for the cutting tool 120. In other words, the operative secondary cutting edge 112 radially overlaps with the first cutting edge 130 of the side cutting insert 128. In this manner, the cutting tool 120 may cut a radially continuous circular drill hole in the work piece. It would be appreciated that the laterally extending secondary cutting edge 112 may thus alleviate the need of having two side cutting inserts, on both sides of the central cutting insert 100, and as such, the side cutting insert 128 and the central drill insert 100 are the only cutting inserts at the tool front end 126.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A central drill insert (100) having rotational symmetry about a central insert axis (I), the central drill insert (100) comprising:
    a bottom surface (102) having a bottom plane (P), a top surface (104), and a peripheral surface (106) extending therebetween;
    at least three lead drill portions (108) protruding outwards from the peripheral surface (106), each lead drill portion (108) having a drill axis (H) and a plurality of drill cutting edges (110) converging towards the drill axis (H);
    at least three secondary cutting edges (112), each adjacent an associated lead drill portion (108), extending along the intersection of the top surface (104) and the peripheral surface (106) transversely to the respective drill axis (H), each secondary cutting edge (112) being axially spaced apart from the drill cutting edges (110) of the respective lead drill portion (108) along the respective drill axis (H);
    at least three abutment flanks (116) formed on the peripheral surface (106) along the intersection of the top surface (104) and the peripheral surface (106), each extending from one of the lead drill portions (108) towards the secondary cutting edge (112) associated with another lead drill portion (108), each abutment flank (116) forming a dovetail angle (α) of less than 90° with the bottom plane (P).

2. The central drill insert (100) according to claim 1, wherein the rotational symmetry about the central insert axis (I) is 120° rotational symmetry.

3. A cutting tool (120) having a tool holder (118) with a shank (122) and a central rotation axis (R), the cutting tool (120) comprising:
    a first insert pocket (124) formed at a front end (126) of the tool holder (118), and a side cutting insert (128) retained therein, the side cutting insert (128) having a first cutting edge (130) transverse to the rotation axis (R);
a second insert pocket (132) formed at the front end (126) of the tool holder (118) rotationally opposite of the first insert pocket (124) about the rotation axis (R), and a central drill insert (100) in accordance with claim 1 retained therein.

4. The cutting tool (120) according to claim 3, wherein:
the central drill insert (100) further comprises:
at least three abutment undercuts (114) recessed in the peripheral surface (106) along the intersection of the bottom surface (102) and the peripheral surface (106), each extending opposite one of the secondary cutting edges (112); and
the second insert pocket (132) has
a support surface (134) with a support plane (S), extending parallel to the rotation axis (R), for abutting the bottom surface (102) of the central drill insert (100);
a dovetail clamping surface (136) forming a dovetail angle (α) of less than 90° with the support plane (S), for abutting one of the abutment flanks (116) of the central drill insert (100);
a clamping ledge (138) located across from the dovetail clamping surface (136), for abutting one of the abutment undercuts (114) of the central drill insert (100).

5. The cutting tool (120) according to claim 4, wherein the bottom surface (102) has a bottom plane (P) forming a dovetail angle (α) of less than 90° with each of the abutment flanks (116).

6. The cutting tool (120) according to claim 3, wherein the rotational symmetry of the central drill insert (100) is 120° rotational symmetry about the central insert axis (I).

7. The cutting tool (120) according to claim 3, wherein one of the lead drill portions (108) is operative and protrudes outwards of the front end (126) of the tool holder (118), with the drill cutting edges (110) being the forwardmost edges of the cutting tool (120).

8. The cutting tool (120) according to claim 3, wherein one of the secondary cutting edges (112) is operative, and radially overlaps with the first cutting edge (130) of the side cutting insert (128).

9. The cutting tool (120) according to claim 3, wherein the first cutting edge (130) of the side cutting insert (128) has a first edge length (L1), and an operative secondary cutting edge (112) and an adjacent operative drill cutting edge (110) have a combined second edge length (L2), and
the sum length of the first edge length (L1) and the second edge length (L2) is larger than a radius (r) of the cylindrical shank (122).

10. A cutting tool (120) having a cutting tool front end (126) and a central rotation axis (R), the cutting tool front end (126) comprising:
a first insert pocket (124);
a side cutting insert (128) retained in the first insert pocket (126), the side cutting insert (128) having a first cutting edge (130) transverse to the rotation axis (R);
a second insert pocket (132) formed at the front end (126) and rotationally opposite the first insert pocket (124) about the central rotation axis (R); and
a central drill insert (100) in accordance with claim 1 retained in the second insert pocket (132), wherein:
the side cutting insert (128) and the central drill insert (100) are the only cutting inserts at the tool front end (126).

11. A cutting tool (120) having a tool holder (118) with a shank (122) and a central rotation axis (R), the cutting tool (120) comprising:
a first insert pocket (124) formed at a front end (126) of the tool holder (118), and a side cutting insert (128) retained therein, the side cutting insert (128) having a first cutting edge (130) transverse to the rotation axis (R); and
a second insert pocket (132) also formed at the front end (126) of the tool holder (118), and a central drill insert (100) in accordance with claim 1 retained therein;
wherein:
the side cutting insert (128) and the central drill insert (100) are the only cutting inserts at the tool front end (126).

12. The cutting tool (120) according to claim 11, wherein:
the first and second insert pockets (124, 132) are rotationally opposite one another about the central rotation axis (R).

13. The central drill inserts (100) according to claim 1, further comprising:
at least three abutment undercuts (114), each recessed in the peripheral surface (106) along the intersection of the bottom surface (102) and the peripheral surface (106) and extending opposite one of the secondary cutting edges (112).

14. The central drill insert (100) according to claim 13, wherein each abutment flank (116) is adjacent to the secondary cutting edge (112) associated with said another lead drill portion (108).

15. The central drill insert (100) according to claim 14, wherein each lead drill portion (108) is configured such that its respective drill axis (H) does not intersect the central insert axis (I) in a top plan view of the central drill insert.

16. The central drill insert (100) according to claim 1, wherein each abutment flank (116) is adjacent to the secondary cutting edge (112) associated with said another lead drill portion (108).

17. The central drill insert (100) according to claim 16, wherein each lead drill portion (108) is configured such that its respective drill axis (H) does not intersect the central insert axis (I) in a top plan view of the central drill insert.

18. The central drill insert (100) according to claim 1, wherein each lead drill portion (108) is configured such that its respective drill axis (H) does not intersect the central insert axis (I) in a top plan view of the central drill insert.

* * * * *